(12) United States Patent
Nishikawa et al.

(10) Patent No.: US 6,735,672 B2
(45) Date of Patent: May 11, 2004

(54) DATA STORAGE ARRAY DEVICE AND DATA ACCESS METHOD

(75) Inventors: Junji Nishikawa, Osaka (JP); Manabu Migita, Neyagawa (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 132 days.

(21) Appl. No.: 09/965,778

(22) Filed: Sep. 29, 2001

(65) Prior Publication Data

US 2002/0040419 A1 Apr. 4, 2002

(30) Foreign Application Priority Data

Sep. 29, 2000 (JP) ........................... 2000-300051

(51) Int. Cl.[7] .............................................. G06F 12/00
(52) U.S. Cl. ........................ 711/114; 711/167; 714/6; 713/502
(58) Field of Search ................................ 711/114, 167; 714/6; 713/502

(56) References Cited

U.S. PATENT DOCUMENTS

| | | | |
|---|---|---|---|
| 5,623,595 A | 4/1997 | Bailey | |
| 5,758,057 A | 5/1998 | Baba et al. | |
| 6,321,345 B1 * | 11/2001 | Mann et al. | 714/6 |
| 6,493,772 B1 * | 12/2002 | Hughes | 710/19 |
| 2002/0069377 A1 * | 6/2002 | Mabuchi et al. | 714/42 |

FOREIGN PATENT DOCUMENTS

| | | |
|---|---|---|
| JP | 2-81123 | 3/1990 |
| JP | 9-69027 | 3/1997 |

* cited by examiner

Primary Examiner—Hiep T. Nguyen
(74) Attorney, Agent, or Firm—RatnerPrestia

(57) ABSTRACT

A data storage array device includes redundant data storage devices and a controller. The controller includes a set of instructions issued to the data storage devices; a detector for detecting responses to the set of instructions; a timer; and a processor for monitoring the responses. If the responses from all data storage devices finished within a period set by the timer, the processor completes response processing for the set of instructions at the point when the responses finished. If the responses from all data storage devices are not finished at the end of a period set by the timer, the processor completes response processing for the set of instructions using only the responses that are finished at the end of the period of the timer.

14 Claims, 7 Drawing Sheets

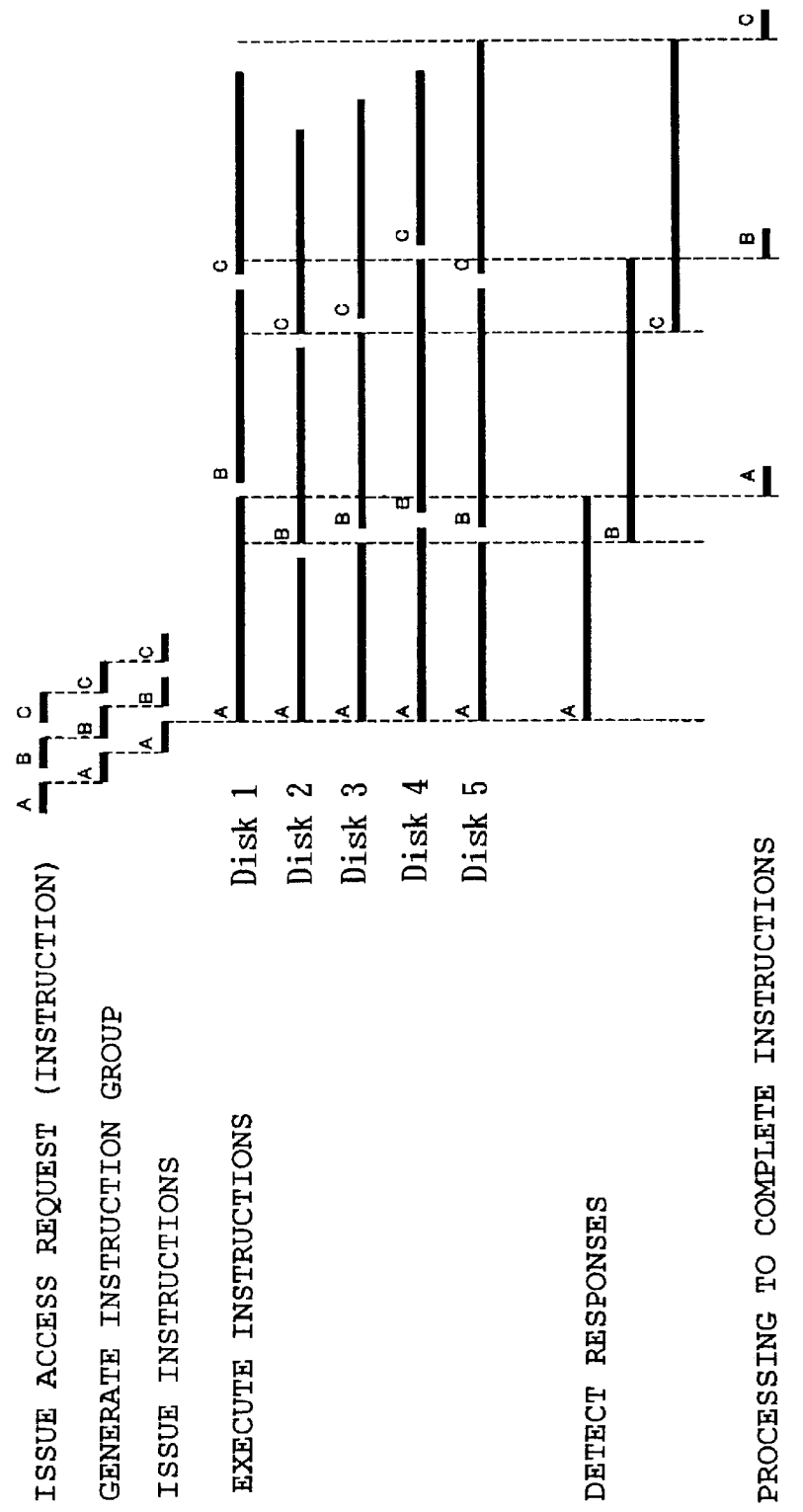

DATA STORAGE ARRAY DEVICE AND DATA ACCESS METHOD

BACKGROUND OF THE INVENTION

1. Field of the Invention

The present invention relates to a data storage array device having a redundant configuration and so on for storing continuous media data such as image information.

2. Related Art of the Invention

With the recent development in multimedia technology, continuous media data such as digital images and voice data are more often recorded onto data storage devices (random access devices) such as a hard disk drive. For image data, such as MPEG for example, the transfer rate is about 1.5 to 30 Mbps per stream. Further, since the data size of continuous media data is large, it is becoming common to use several random access devices as an array, and to allow them to be externally recognized as one virtual large-capacity device.

Accessing continuous media data requires uninterrupted access to the data in data storage devices and reliability with which the server system as a whole does not stop even if a part of the data storage devices goes wrong. A plurality of data storage devices in a redundant configuration also enable recovery of correct data by using redundant data even if a part of the data storage devices goes wrong.

In a data storage array device with a redundant configuration, when a host writes data, the data from the host is written to the data storage devices with redundant data added to it. When the host requests data to be read out, the data is read out and returned to the host as it is, if all data storage devices are operating properly. If there is a failure in one of the data storage devices, the redundant configuration enables the data in the failed part to be reconstructed from the data of the remaining data storage devices operating properly and the redundant data to return the data to the host.

A data storage array device having such a redundant configuration can address partial failures of data storage devices. However, a server system for continuous media is not allowed to cause significant delay with respect to access requests from a host even if it may not be regarded as a failure, because delay above a certain level causes discontinuity of images.

To guarantee the response time delay in a data storage array device for such a server system that supports continuous media, some methods use a timer to guarantee the response time.

One of the conventional methods of processing with a timer upon reading out, Japanese Patent Laid-Open No. 2–81123 specification entitled "Parallel Data Transfer System and Its Device", discloses a method in which delay of a response due to a failure of a data storage device is detected, and data is reconstructed by using redundant data. In a configuration of N number of data disks and one redundant disk, delay for Read requests addressed to the N+1 disks is detected by starting a timer when any one of the disks responds to the Read request. If the last one has not responded after a predetermined period, the data of the disk with its response delayed is recovered from data of the proper data disks and data of the redundant disk. Thus, the delay after the disks begin to respond can be limited to a certain range.

Another conventional example, Japanese Patent Laid-Open No. 9–69027 entitled "Recording System for Multimedia", discloses a method of guaranteeing delay with a timeout table for guaranteeing the response time for a plurality of users. The timeout table is set for each user, and a timer is set upon receipt to fare quest from a host, then Read or Write requests are issued to the disks. Timeout processing is performed when a response of any disk is delayed. If necessary data has not been accessed after a period stored in the timeout table, redundant data is accessed to recover the necessary data, and the response is returned to the host. After response to the host, the operation returns to the state of waiting the next requests from the host and repeats requesting to the disks and the timeout processing described above when a new request arrives. The delay time from the arrival of requests to the return of responses can be guaranteed by timer values in the timeout table.

However, the conventional data storage array devices have the problems described below.

The problems involved in the timer processing as in the conventional devices are as follows. Typical disk devices, which involves an access waiting time including a seek time of a magnetic head and a waiting time for disk rotation, adopts multiprocessing of commands (Read or Write instructions) by command queuing in order to optimize disk accesses and to increase the total transfer rate.

Optimizing execution of a plurality of commands within the disk devices by the command queuing can improve the transfer rate more significantly than separately processing commands without queuing. However, in the conventional examples, timer processing is performed in which requests and responses are in one-to-one correspondence, so that it is impossible to queue a plurality of requests from the host. Thus, each disk device processes the access requests independently of other requests, which precludes the disk devices from offering their full performance and from supplying data at a high transfer rate as a data storage array device.

If the data storage array device supports the command queuing in response to successive requests issued by the host, it is possible to increase efficiency of the operation of the disk devices by queuing accesses to the disk devices. However, it is difficult for the conventional methods using a timer to guarantee the response delay times imply by queuing accesses to the disk devices. For example, if the access time is guaranteed for the maximum number of requests acceptable at a time, the timer will be set long and therefore the response delay time will belong with no guarantee of real time operation. Further, when there are a small number of users, only a few requests are accepted at a time and the waiting time will be wasted.

SUMMARY OF THE INVENTION

Thus, with a view to solving the above-mentioned problems, the object of the present invention is to guarantee response performance for continuous media data accesses and to provide a data storage array device and so on that perform multiprocessing of a plurality of access requests while having a high transfer efficiency.

One aspect of the present invention is a data storage array device including: a plurality of data storage devices having a redundant information; and a controller that controls the data storage devices, wherein said controller comprises:
instruction issuing means of sequentially issuing access instruction groups configured by a plurality of divided access instructions, to said plurality of data storage devices;

response detecting means of detecting responses to the instructions executed in the data storage devices;

timer means of counting time; and completion processing means, which monitors a group of responses to a given one of the access instruction groups, and if the responses from all data storage devices have been finished within a period set by the timer means, completes response processing for the given one of the access instruction groups at the point when the responses have been finished, and if the responses from all data storage devices have not been finished at the end of a period set by the timer, completes response processing for the given one of the access instruction groups by using only the responses from the data storage devices that have finished their responses at the end of the period of the timer.

Another aspect of the present invention is the data storage array device according to 1st invention, wherein the timer for a given one of the access instruction groups is started with a timing of the response finished last in a group of responses to the just previous one of the access instruction groups.

Still another aspect of the present invention is the data storage array device, wherein the timer for a given one of the access instruction groups is started with a timing of the response finished first in a group of responses to the just previous one of the access instruction groups.

Yet still another aspect of the present invention is the data storage array device, wherein the timer for a given one of the access instruction groups is started with a timing between that of the response finished last and that of the response finished first in a group of responses to the just previous one of the access instruction groups.

Still yet another aspect of the present invention is the data storage array device, wherein the timer for a given one of the access instruction groups is started with a timing of the start of the instruction executed first in the given one of the access instruction groups.

A further aspect of the present invention is the data storage array device, wherein the timer for a given one of the access instruction groups is started with a timing of the start of the instruction executed last in the given one of the access instruction groups.

A still further aspect of the present invention is the data storage array device, wherein the timer for a given one of the access instruction groups is started with a timing between that of the start of the instruction executed first and that of the start of the instruction executed last in the given one of the access instruction groups.

A yet further aspect of the present invention is the data storage array device, wherein, as long as the responses from all data storage devices have not been finished at the end of a period set by the timer, the timer is started next at the end of the period of the timer.

A still yet further aspect of the present invention is the data storage array device, wherein, when the responses from all data storage devices have not been finished at the end of a period set by the timer, data of a data storage device that has not finish its response is recovered by using data of a predetermined number of data storage devices, including a data storage data stored therein, that have finished their responses.

An additional aspect of the present invention is a data access method for a data storage array device, including: a plurality of data storage devices having a redundant information; and a controller that controls the data storage devices, wherein said controller comprises the steps of:

multiplexingly and sequentially issuing access instruction groups to said plurality of data storage devices;

detecting responses to the instructions executed in the data storage devices;

counting time with timer means;

monitoring a group of responses to a given one of the multiplexed access instruction groups;

if the responses from all data storage devices have been finished within a period set by the timer means, completing response processing for the given one of the access instruction groups at the point when the responses have been finished; and if the responses from all data storage devices have not been finished at the end of a period set by the timer, completing response processing for the given one of the access instruction groups by using only the responses from the data storage devices that have finished their responses at the end of the period of the timer.

BRIEF DESCRIPTION OF THE DRAWINGS

FIG. 7 is a timing diagram of execution of instruction groups.

Description of Symbols

10 Host device
11 External interface
20 Data storage array device
21 Controller
31, 32, 33, 34, 35 Data storage device

PREFERRED EMBODIMENT OF THE INVENTION

Figure 1:
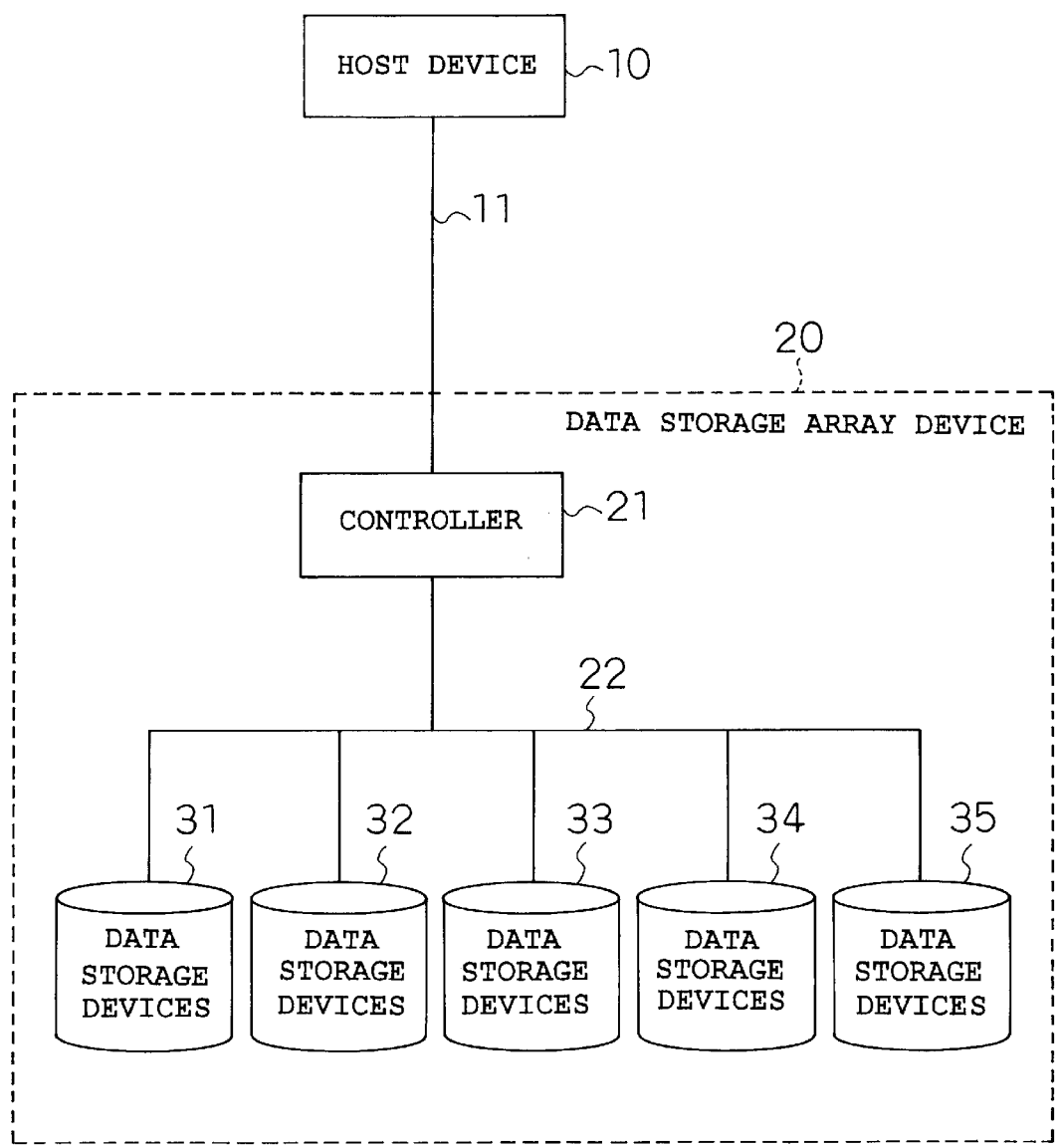
FIG. 1 is a block diagram illustrating a configuration of a data storage array device according to an embodiment of the present invention.

Now, embodiments of the present invention will be described in detail by using drawings. FIG. 1 is a diagram illustrating a configuration of a server system that consists a data storage array device and a host device according an embodiment of the invention.

A data storage array device 20 is connected to a host device 10 and responds to data access requests from the host device 10. The host device 10 and a plurality of data storage devices 31 to 35 are connected to a controller 21, which controls accesses in the data storage array device 20.

The data storage devices 31 to 35 are data storage devices to record data itself and redundant data. The external host device 10 issues data access requests in sequence to the data storage array device 20. The external host device 10 and data storage array device 20 are connected to each other by an external interface 11, such as an interface compliant with the FastWide SCSI standard or the FibreChannel standard, for example.

The controller 21 accesses data of the data storage devices 31 to 35 by accepting a data access request is sued by the external host device 10, dividing the request into a plurality of data access requests so as to be a group of data access instructions, and issuing them to the data storage devices 31 to 35. For example, if a Read request is issued, data of the data storage devices 31 to 35 is read out and transferred to the host device 10. On completion of all access requests issued to the data storage devices 31 to 35, the external host device 10 is informed of the completion of the transfer as one data access response.

Figure 2:
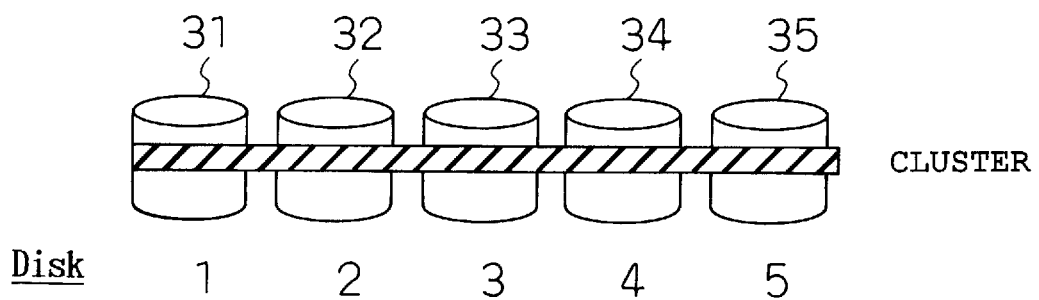
FIG. 2 is a block diagram illustrating a management area the data storage array device.

Next, the way to read and write data for the redundant configuration will be described. FIG. 2 is a schematic diagram illustrating a form in which data is stored. As shown in FIG. 2, if there are five data storage devices 31 to 35 (Disk 1 to 5), a unit of data (cluster) forms a redundant group and is divided into five, each of which is stored in one of the five disks. One of the disks is for redundant data, and it uses parity for example. The four disks, Disk 1 to 4, are the data storage devices for data, in which data itself is stored. The remaining one, Disk 5, is the data storage device for parity, which stores parity-values calculated from the data of the other four data storage devices.

In writing of data by the external host device 10 to a cluster, the data is stored in the five data storage devices 31 to 35 after a parity value is calculated. For example, the parity is set such that the total number of 1 in the data values of the four devices including the parity bit becomes an even number. If the data values are 0, 1, 0, 0 by way of example, then the parity value is 1, which is stored in the Disk 5 for parity.

Normally, when a data Read request for a cluster is received from the external host device 10, data from the four data storage devices for data 31 to 34 operating properly is transferred as a unit to the external host device 10. If a failure occurs at a part of the data storage devices 31 to 35, e.g., the data storage device 34, the data of the data storage device 34 can be recovered by performing parity calculation once the data of the three storage devices for data 31 to 33 and the data storage device for parity 35 are read out. In the above-mentioned example, it can be seen from the values 0, 1, 0 of the Disks 1 to 3 and the parity value 1 of the Disk 5 that the data of the remaining device is 0.

Embodiment 1

Now, the operation of the data storage array device will be described according to FIGS. 3 to 6.

Figure 3:
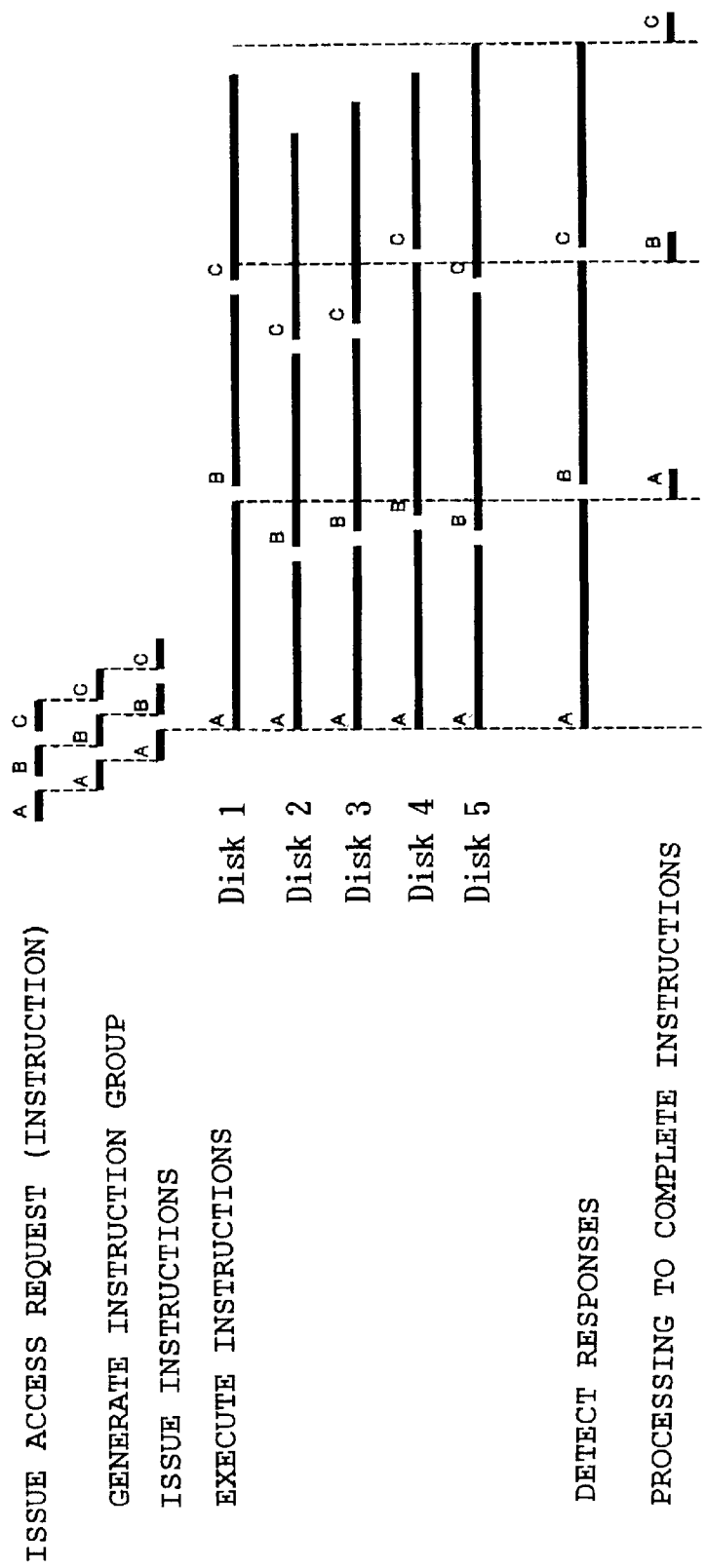
FIG. 3 is a timing diagram of execution of instruction ups.
Figure 5:
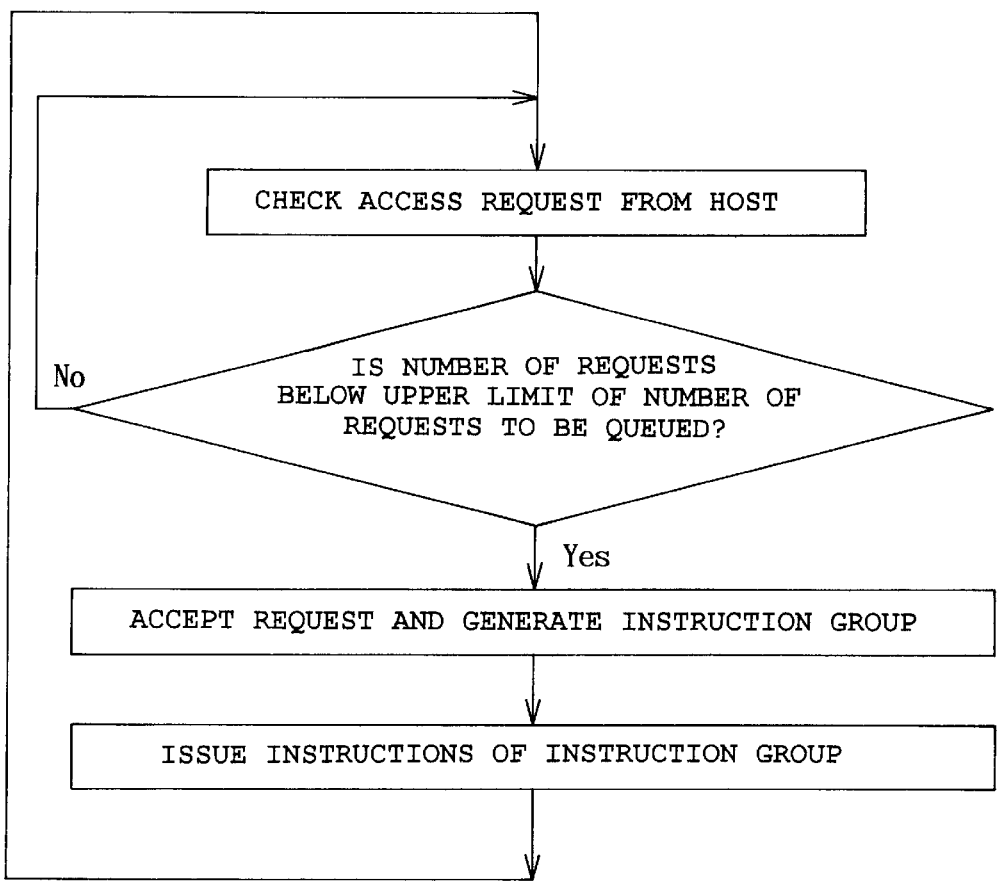
FIG. 5 is a flow chart of processing to issue instructions.

FIG. 3 is a time chart from the point when the host device 10 requests accesses to the point when responses are completed, in which the number of commands to be queued is three. In this figure, the access requests from the host device 10 are identified with the symbol A, B, and C. FIG. 5 shows steps from the receipt of the access requests to the issue of instructions to the Disks 1 to 5. It is checked that the number of the requests from the host does not exceed the upper limit of queuing (three in this case), and if it does not, the requests are accepted and the instructions to access Disk 1 to 5 are generated. In the case of writing, redundant data is generated and a plurality of instructions to write data and redundant data are generated. In the case of reading out, a plurality of instructions to read out data from the Disks 1 to 5 constituting a cluster belonging to one instruction group are generated. The generated instructions are issued to the respective Disks 1 to 5 at the next step.

As shown in FIG. 3, the instructions A, B, and C are configured as respective instruction groups and issued in a multiplexed manner. Once the instructions of the instruction group A are issued to the Disks 1 to 5, they are executed in their respective Disks. The Disks vary in their response time by their nature, because they are subject to the seek time of a magnetic head, the waiting time for disk rotation, the retry time, and so on. As to the instruction group A in the case of FIG. 3, firstly the Disk 2 finishes its response, and then the responses from the other Disks are sequentially detected. Lastly, the Disk 1 finishes its response, with which the response detection for the instruction group A is finished.

Figure 6:
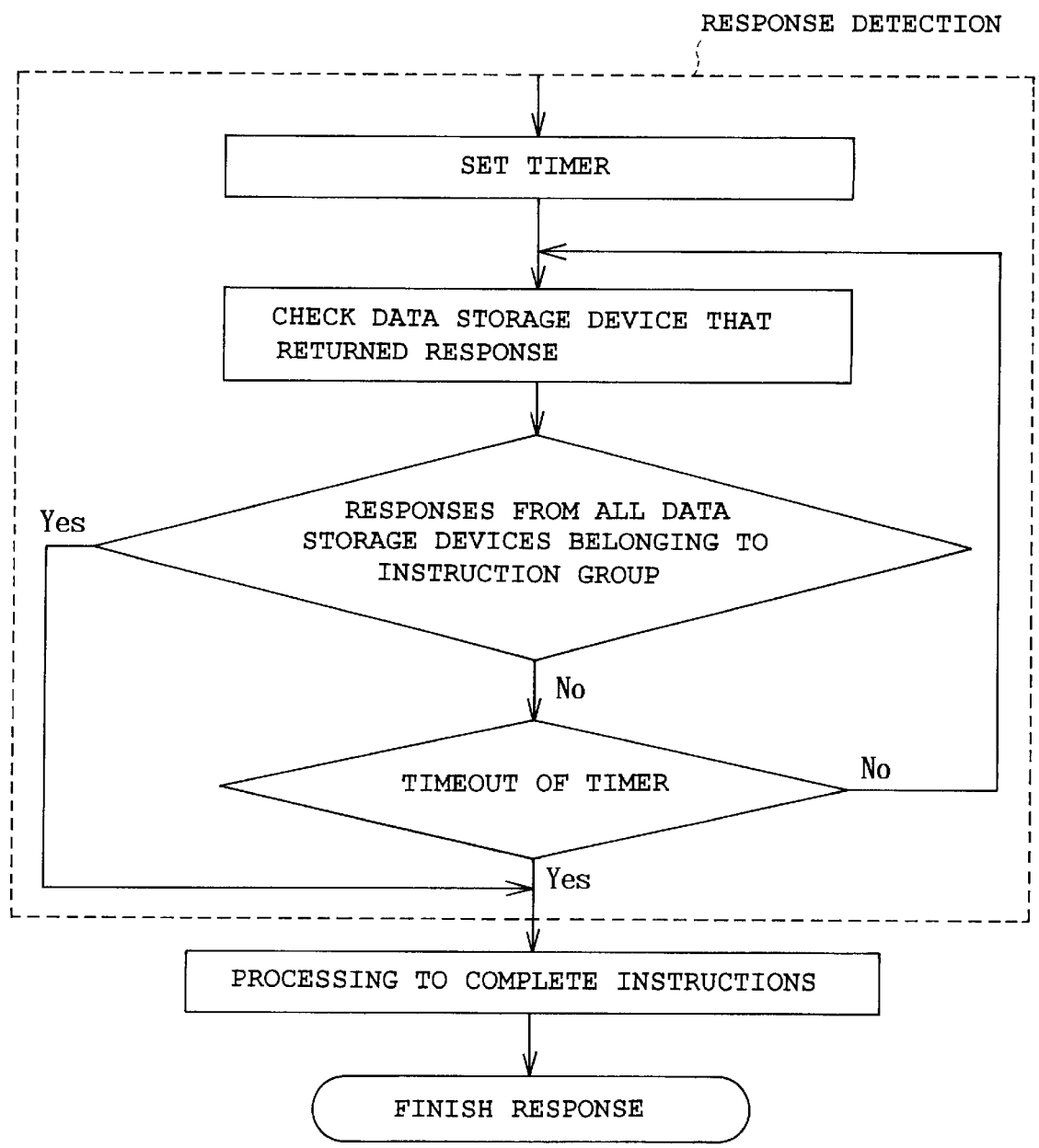
FIG. 6 is a flow chart of processing to detect responses.

Next, the timer setting and the processing to complete instructions are described with reference to FIG. 6. When the processing enters the detection of responses, firstly a timer is set (initially, the timings to start execution are all aligned as in FIG. 3, and the timer is started according to it). Then, responses from the Disks 1 to 5 are checked to see whether there are responses from all Disks 1 to 5 belonging to the instruction group A or not. If there are responses from all Disks 1 to 5 belonging to the instruction group A before the time is up (see FIG. 4A), a response for A is returned to the host 10 (the processing to complete instructions). Naturally, once the processing for A is finished, each Disk begins to process an instruction of B. The timer is reset and started upon finish of the response of the last Disk 1.

If the timer indicates timeout before responses from all Disks 1 to 5 are returned (see FIG. 4B), a response for A is returned to the host 10 upon the timeout as described later (the processing to complete instructions). In this case, the timer will be reset and started upon finish of the response of the last Disk 1.

This response detection can be performed for each instruction group in parallel to detect the responses independently of each group.

It is also possible to repeat a common response detection processing to sequentially process a plurality of instruction groups. In the case of sequential processing, the processing does not overlap among the groups as shown in FIG. 3. In practical applications, the timer may be used exclusively, for example with semaphore.

Figure 4A:
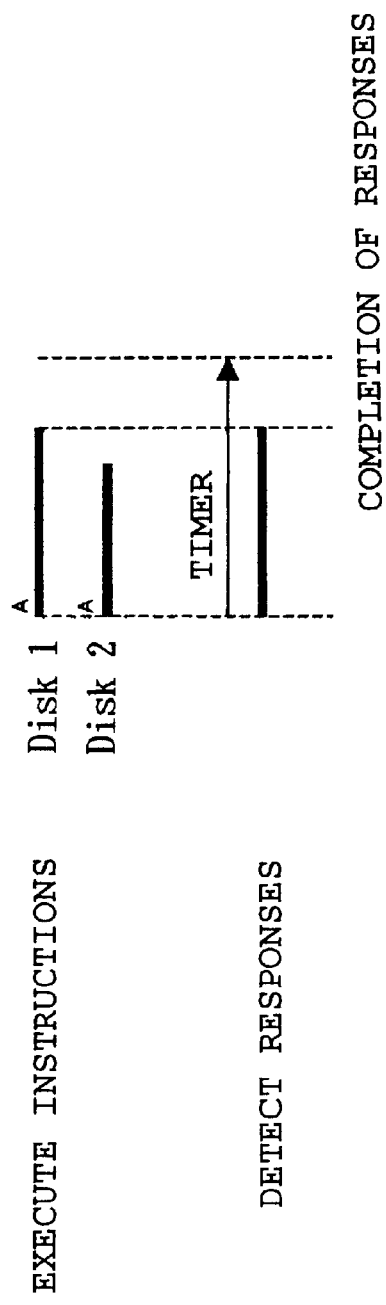
FIG. 4 is a timing diagram of processing to complete instructions.
Figure 4B:
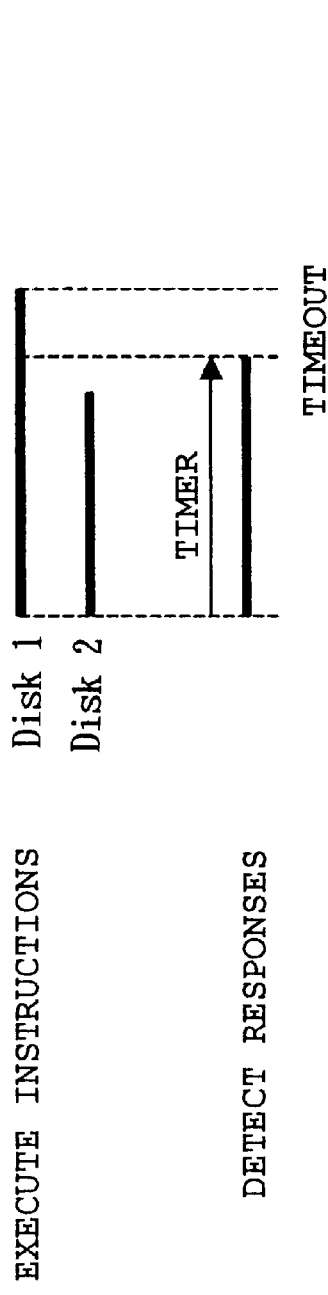

Now, a more concrete description will be provided. The processing to complete instructions will be described by using FIG. 4. In the response detection, if responses have been returned from all Disks 1 to 5 belonging to the instruction group A before timeout is detected by the timer, the point when the last request was returned is regarded as the completion of the responses, and the processing to complete instructions is performed, as shown in FIG. 4A. The processing to complete instructions here is to transfer the data (cluster) that has been read out to the host 10 if the access request from the host 10 is a Read request. If the timer indicates timeout before responses are returned from all Disks 1 to 5 belonging to the instruction group, the processing to complete instructions is performed at the point of the timeout, as shown in FIG. 4B. The processing to complete instructions here is to transfer the data to the host 10 if the data storage devices that have returned the responses are Disks 1 to 4, for example, since necessary data has been obtained. If one of the Disks 1 to 4 has not return the response, the data is recovered as described above by using the data of the disk 5, which is redundant data, and transferred to the host 10.

Next, the operation to detect responses to a plurality of instruction groups in sequence will be described. When the response detection for the instruction group A in FIG. 3 is finished, the response detection for the next instruction group B is started (the timer is started). When the response detection for the instruction group B is started, the Disks 2 to 5 have already begun to execute the respective instructions. The response detection for the instruction B is finished on the timeout of the timer, or on detection of the responses from all Disks 1 to 5 belonging to the instruction group B, as in the case of the group A. Then, as in the case of the instruction group A, the processing to complete instructions is performed for the instruction group B as well.

Then, the instruction group C is also processed in the same manner. During the processing for each instruction group, any new access request delivered from the host device 10 is accepted if the queue becomes available, and it undergoes the same process sequence.

With the above-described operation, the data storage devices 31 to 35 can operate so that the movement of the head and the waiting time for rotation of the head are minimized, because they operate with commands queued. Thus, the data storage devices 31 to 35 efficiently operate, there by realizing an improved transfer rate. Further, because the timer value of the timer depends on the execution time for each instruction group, it may be set to a fixed value independent of the number of queued instructions (commands). Moreover, the timer is evaluating the instruction execution times for the data storage devices 31 to 35, and therefore the maximum transfer performance of the data storage devices 31 to 35 can be obtained and the response delay time can be minimized. In addition, because one timer may be used exclusively in the response detection shown in FIG. 3, the need for multiplexed timer management is eliminated.

That is, the next start of the timer is not limited to the above-described example, but the timer may be started next with the timing of the response finished first. Alternatively, the timer may be started at the time when an intermediate Disk between the first Disk and the last Disk finishes its response, such as the Disk 3, 4, or 5 in the case of FIG. 3.

Further, while the timer may be started next in such a manner as described above if timeout does not occurred, the timer may be started next at the point of timeout as long as the timeout occurred.

Embodiment 2

Now, an exemplary operation for isolating the start of response detection for each instruction group from each other will be described by using FIG. 7. In FIG. 7, the timings to start response detection (to start the timer) vary. For each instruction group, the response detection for the instruction group is started (the timer is started) at the time when one of the instructions belonging to the instruction group first begins to be executed in one of the Disks 1 to 5. In this case, the response detection is executed independently for each instruction group, and the timer is also counted separately for each instruction group. For the instruction group B, one of the instructions first begins to be executed in the Disk 2, therefore the response detection is started at the point. The details of the response detection are the same (FIG. 6). This operation has the same advantages as those of the operation of FIG. 3, but it also realizes earlier responses in applications that impose more severe conditions for response delay, since response delay after the response from the earliest data storage device can be evaluated for each instruction group. In addition, if delay constantly occurs in a certain data storage device, that data storage device can be always processed as timeout so that a fast response can be always provided.

As variations, the timer may be started with the timing of the start of the instruction executed last, or alternatively with the timing between the start of the instruction executed first and the start of the instruction executed last.

As described above, even if a temporal trouble such as delay occurs, the data storage array device according to the embodiments can supply correct data within a certain delay period by the multiplex issue of instructions and the response detection for the instruction groups. The multiplex issue of instructions then enables efficient accesses within the data storage devices.

In FIG. 7, although the response detection for an instruction group in one of the data storage devices is initiated when any one of the data storage devices begins execution of the instruction, the response detection for one of the data storage devices may be initiated when the data storage device finishes execution of the instruction of the just previous instruction group, instead. Further, the response detection for an instruction group may be initiated when all data storage devices has begun execution of the instructions belonging to that instruction group, instead of when one of the data storage devices begins execution of the instruction. Further, in FIG. 3, after the response detection for an instruction group is finished, then the processing to complete instructions for the instruction group and the response detection for the next instruction group are performed. However, the response detection for the next instruction group may be initiated after the response detection for an instruction group is finished and the processing to complete instructions for the instruction group is finished.

In the present embodiments, although the instructions are multiplexed for an access request from the host device, accesses to the data storage devices, such as accesses for data reconstruction, may be also multiplexed in the data storage array device.

In the embodiments, although the total number of the data storage devices and the number of the data storage devices constituting an instruction group are the same, the number of the data storage devices constituting an instruction group may be any number more than one.

The timer value in the response delay detection for each instruction group may be different from each other, and it may vary according to the number of commands being queued, so that the response time can be guaranteed depending on whether commands are in the queue or not.

As apparent from the foregoing description, data is efficiently transferred to data storage devices by the multiplex issue of instructions with command queuing, and the response delay is guaranteed by the response detection (timer management) for each instruction group, according to the invention.

Further, the timer value in the response detection may be set to be a fixed value independent of the number of commands being queued, in which case the response delay time may be uniform.

What is claimed is:

1. A data storage array device including:
    a plurality of data storage devices having redundant information; and a controller that controls the data storage devices,
    wherein said controller comprises:
        instruction issuing means of issuing access instruction groups configured by a plurality of divided access instructions, to said plurality of data storage devices, without waiting for completion of a response from each of said storage devices;
        response detecting means of detecting responses to the instructions executed in the data storage devices;
        a timer for counting time; and
        completion processing means, which monitors a group of responses to a given one of the access instruction groups, and
        if the responses from all data storage devices have been finished within a period set by the timer, completes response processing for the given one of the access instruction groups at the point when the responses have been finished, and
        if the responses from all data storage devices have not been finished at the end of a period set by the timer, completes response processing for the given one of the access instruction groups by using only the responses from the data storage devices that have finished their responses at the end of the period of the timer, and timing of the timer for a given one of the access instruction groups is started with a timing of the response finished last in a group of responses to the just previous one of the access instruction groups.

2. A data storage array device including:

a plurality of data storage devices having redundant information; and a controller that controls the data storage devices, wherein said controller comprises:

instruction issuing means of issuing access instruction groups configured by a plurality of divided access instructions, to said plurality of data storage devices, without waiting for completion of a response from each of said storage devices;

response detecting means of detecting responses to the instructions executed in the data storage devices;

a timer for counting time; and completion processing means, which monitors a group of responses to a given one of the access instruction groups, and if the responses from all data storage devices have been finished within a period set by the timer, completes response processing for the given one of the access instruction groups at the point when the responses have been finished, and if the responses from all data storage devices have not been finished at the end of a period set by the timer, completes response processing for the given one of the access instruction groups by using only the responses from the data storage devices that have finished their responses at the end of the period of the timer, and timing of the timer for a given one of the access instruction groups is started with a timing of the response finished first in a group of responses to the just previous one of the access instruction groups.

3. A data storage array device including:

a plurality of data storage devices having redundant information; and a controller that controls the data storage devices, wherein said controller comprises:

instruction issuing means of issuing access instruction groups configured by a plurality of divided access instructions, to said plurality of data storage devices, without waiting for completion of a response from each of said storage devices;

response detecting means of detecting responses to the instructions executed in the data storage devices;

a timer for counting time; and completion processing means, which monitors a group of responses to a given one of the access instruction groups, and if the responses from all data storage devices have been finished within a period set by the timer, completes response processing for the given one of the access instruction groups at the point when the responses have been finished, and if the responses from all data storage devices have not been finished at the end of a period set by the timer, completes response processing for the given one of the access instruction groups by using only the responses from the data storage devices that have finished their responses at the end of the period of the timer, and timing of the timer for a given one of the access instruction groups is started with a timing between that of the response finished last and that of the response finished first in a group of responses to the just previous one of the access instruction groups.

4. A data storage array device including:

a plurality of data storage devices having redundant information; and a controller that controls the data storage devices, wherein said controller comprises:

instruction issuing means of issuing access instruction groups configured by a plurality of divided access instructions, to said plurality of data storage devices, without waiting for completion of a response from each of said storage devices;

response detecting means of detecting responses to the instructions executed in the data storage devices;

a timer for counting time; and completion processing means, which monitors a group of responses to a given one of the access instruction groups, and if the responses from all data storage devices have been finished within a period set by the timer, completes response processing for the given one of the access instruction groups at the point when the responses have been finished, and if the responses from all data storage devices have not been finished at the end of a period set by the timer, completes response processing for the given one of the access instruction groups by using only the responses from the data storage devices that have finished their responses at the end of the period of the timer, and timing of the timer for a given one of the access instruction groups is started with a timing of the start of the instruction executed first in the given one of the access instruction groups.

5. A data storage array device including:

a plurality of data storage devices having redundant information; and a controller that controls the data storage devices, wherein said controller comprises:

instruction issuing means of issuing access instruction groups configured by a plurality of divided access instructions, to said plurality of data storage devices, without waiting for completion of a response from each of said storage devices;

response detecting means of detecting responses to the instructions executed in the data storage devices;

a timer for counting time; and completion processing means, which monitors a group of responses to a given one of the access instruction groups, and if the responses from all data storage devices have been finished within a period set by the timer, completes response processing for the given one of the access instruction groups at the point when the responses have been finished, and if the responses from all data storage devices have not been finished at the end of a period set by the timer, completes response processing for the given one of the access instruction groups by using only the responses from the data storage devices that have finished their responses at the end of the period of the timer, and timing of the timer for a given one of the access instruction groups is started with a timing of the start of the instruction executed last in the given one of the access instruction groups.

6. A data storage array device including:
a plurality of data storage devices having redundant information; and a controller that controls the data storage devices,
wherein said controller comprises:
  instruction issuing means of issuing access instruction groups configured by a plurality of divided access instructions, to said plurality of data storage devices, without waiting for completion of a response from each of said storage devices;
  response detecting means of detecting responses to the instructions executed in the data storage devices;
  a timer for counting time; and
  completion processing means, which monitors a group of responses to a given one of the access instruction groups, and
  if the responses from all data storage devices have been finished within a period set by the timer, completes response processing for the given one of the access instruction groups at the point when the responses have been finished, and
  if the responses from all data storage devices have not been finished at the end of a period set by the timer, completes response processing for the given one of the access instruction groups by using only the responses from the data storage devices that have finished their responses at the end of the period of the timer, and
  timing of the timer for a given one of the access instruction groups is started with a timing between that of the start of the instruction executed first and that of the start of the instruction executed last in the given one of the access instruction groups.

7. The data storage array device according to any one of claims 1–6, wherein, as long as the responses from all data storage devices have not been finished at the end of a period set by the timer, the timer is started next at the end of the period of the timer.

8. The data storage array device, according to any one of claims 1–6 wherein, when the responses from all data storage devices have not been finished at the end of a period set by the timer, data of a data storage device that has not finished its response is recovered by using data of a predetermined number of data storage devices, including a data storage device with redundant data stored therein, that have finished their responses.

9. A data access method for a data storage array device including: a plurality of data storage devices having a redundant information; and a controller that controls the data storage devices,
wherein said controller performs the steps of:
  issuing access instruction groups to said plurality of data storage devices, without waiting for completion of a response from each of said storage devices;
  detecting responses to the instructions executed in the data storage devices;
  counting time with a timer;
  monitoring a group of responses to a given one of the access instruction groups;
  if the responses from all data storage devices have been finished within a period set by the timer, completing response processing for the given one of the access instruction groups at the point when the responses have been finished;
  if the responses from all data storage devices have not been finished at the end of a period set by the timer, completing response processing for the given one of the access instruction groups by using only the responses from the data storage devices that have finished their responses at the end of the period of the timer, and
  starting the timer for a given one of the access instruction groups with a timing of the response finished last in a group of responses to the just previous one of the access instruction groups.

10. A data access method for a data storage array device including: a plurality of data storage devices having a redundant information; and a controller that controls the data storage devices,
wherein said controller performs the steps of:
  issuing access instruction groups to said plurality of data storage devices, without waiting for completion of a response from each of said storage devices;
  detecting responses to the instructions executed in the data storage devices;
  counting time with a timer;
  monitoring a group of responses to a given one of the access instruction groups;
  if the responses from all data storage devices have been finished within a period set by the timer, completing response processing for the given one of the access instruction groups at the point when the responses have been finished;
  if the responses from all data storage devices have not been finished at the end of a period set by the timer, completing response processing for the given one of the access instruction groups by using only the responses from the data storage devices that have finished their responses at the end of the period of the timer, and
  starting the timer for a given one of the access instruction groups with a timing of the response finished first in a group of responses to the just previous one of the access instruction groups.

11. A data access method for a data storage array device including: a plurality of data storage devices having a redundant information; and a controller that controls the data storage devices,
wherein said controller performs the steps of:
  issuing access instruction groups to said plurality of data storage devices, without waiting for completion of a response from each of said storage devices;
  detecting responses to the instructions executed in the data storage devices;
  counting time with a timer;
  monitoring a group of responses to a given one of the access instruction groups;
  if the responses from all data storage devices have been finished within a period set by the timer, completing response processing for the given one of the access instruction groups at the point when the responses have been finished;
  if the responses from all data storage devices have not been finished at the end of a period set by the timer, completing response processing for the given one of the access instruction groups by using only the responses from the data storage devices that have finished their responses at the end of the period of the timer, and
  starting the timing for a given one of the access instruction groups with a timing between that of the response finished last and that of the response finished first in a group of responses to the just previous one of the access instruction groups.

12. A data access method for a data storage array device including: a plurality of data storage devices having a redundant information; and a controller that controls the data storage devices, wherein said controller performs the steps of:
issuing access instruction groups to said plurality of data storage devices, without waiting for completion of a response from each of said storage devices;
detecting responses to the instructions executed in the data storage devices;
counting time with a timer;
monitoring a group of responses to a given one of the access instruction groups;
if the responses from all data storage devices have been finished within a period set by the timer, completing response processing for the given one of the access instruction groups at the point when the responses have been finished;
if the responses from all data storage devices have not been finished at the end of a period set by the timer, completing response processing for the given one of the access instruction groups by using only the responses from the data storage devices that have finished their responses at the end of the period of the timer, and
starting the timer for a given one of the access instruction groups with a timing of the start of the instruction executed first in the given one of the access instruction groups.

13. A data access method for a data storage array device including: a plurality of data storage devices having a redundant information; and a controller that controls the data storage devices, wherein said controller performs the steps of:
issuing access instruction groups to said plurality of data storage devices, without waiting for completion of a response from each of said storage devices;
detecting responses to the instructions executed in the data storage devices;
counting time with a timer;
monitoring a group of responses to a given one of the access instruction groups;
if the responses from all data storage devices have been finished within a period set by the timer, completing response processing for the given one of the access instruction groups at the point when the responses have been finished;
if the responses from all data storage devices have not been finished at the end of a period set by the timer, completing response processing for the given one of the access instruction groups by using only the responses from the data storage devices that have finished their responses at the end of the period of the timer, and
starting the timer for a given one of the access instruction groups with a timing of the start of the instruction executed last in the given one of the access instruction groups.

14. A data access method for a data storage array device including: a plurality of data storage devices having a redundant information; and a controller that controls the data storage devices, wherein said controller performs the steps of:
issuing access instruction groups to said plurality of data storage devices, without waiting for completion of a response from each of said storage devices;
detecting responses to the instructions executed in the data storage devices;
counting time with a timer;
monitoring a group of responses to a given one of the access instruction groups;
if the responses from all data storage devices have been finished within a period set by the timer, completing response processing for the given one of the access instruction groups at the point when the responses have been finished;
if the responses from all data storage devices have not been finished at the end of a period set by the timer, completing response processing for the given one of the access instruction groups by using only the responses from the data storage devices that have finished their responses at the end of the period of the timer, and
starting the timer for a given one of the access instruction groups with a timing between that of the start of the instruction executed first and that of the start of the instruction executed last in the given one of the access instruction groups.

* * * * *

UNITED STATES PATENT AND TRADEMARK OFFICE
CERTIFICATE OF CORRECTION

PATENT NO. : 6,735,672 B2
DATED : May 11, 2004
INVENTOR(S) : Nishikawa et al.

It is certified that error appears in the above-identified patent and that said Letters Patent is hereby corrected as shown below:

Title page,
Item [22], delete "Sep. 29, 2001" and insert -- Sep. 28, 2001 --.

Signed and Sealed this

Twenty-eighth Day of December, 2004

JON W. DUDAS
*Director of the United States Patent and Trademark Office*